(12) United States Patent
Silvanus et al.

(10) Patent No.: US 9,475,148 B2
(45) Date of Patent: Oct. 25, 2016

(54) FRICTION STIR PROCESSING METHOD FOR A WORKPIECE HAVING SURFACE COATING

(71) Applicant: EADS Deutschland GmbH, Ottobrunn (DE)

(72) Inventors: Juegren Silvanus, Unterhaching (DE); Tommy Brunzel, Meerane (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 15/146,399

(22) Filed: May 4, 2016

(65) Prior Publication Data
US 2016/0243645 A1 Aug. 25, 2016

Related U.S. Application Data

(62) Division of application No. 14/299,423, filed on Jun. 9, 2014, now Pat. No. 9,364,917.

(30) Foreign Application Priority Data

Jun. 10, 2013 (EP) ..................................... 13002961

(51) Int. Cl.
*B23K 20/22* (2006.01)
*B23K 20/12* (2006.01)

(52) U.S. Cl.
CPC ......... *B23K 20/122* (2013.01); *B23K 20/1225* (2013.01)

(58) Field of Classification Search
CPC .......... B23K 20/1225; B23K 20/1255; B23K 20/22
See application file for complete search history.

(56) References Cited

U.S. PATENT DOCUMENTS

| | | | | |
|---|---|---|---|---|
| 5,697,544 | A * | 12/1997 | Wykes | B23K 20/125 156/580 |
| 2002/0011509 | A1 * | 1/2002 | Nelson | B23K 20/122 228/112.1 |
| 2003/0098335 | A1 * | 5/2003 | Saeki | B23K 20/1255 228/112.1 |
| 2003/0201307 | A1 * | 10/2003 | Waldron | B23K 20/122 228/112.1 |
| 2007/0039154 | A1 * | 2/2007 | Gendou | B23K 20/126 29/407.1 |
| 2008/0029581 | A1 * | 2/2008 | Kumagai | B23K 20/1255 228/101 |
| 2008/0296350 | A1 * | 12/2008 | Henneboehle | B23K 20/1245 228/112.1 |
| 2009/0120995 | A1 * | 5/2009 | Hallinan | B23K 20/1255 228/2.3 |
| 2011/0274943 | A1 * | 11/2011 | Fujii | B23K 20/1255 428/615 |
| 2013/0284793 | A1 * | 10/2013 | Moriguchi | B23K 20/1245 228/2.1 |
| 2015/0183054 | A1 * | 7/2015 | Okada | B23K 20/1245 228/2.1 |

* cited by examiner

*Primary Examiner* — Devang R Patel
*Assistant Examiner* — Carlos Gamino
(74) *Attorney, Agent, or Firm* — Crowell & Moring LLP

(57) ABSTRACT

A friction stir processing tool having a shoulder, which is implemented on a body, and which has a friction surface for pressing against at least one workpiece at least partially provided with a surface coating, and a friction reducing unit for reducing the friction resistance between the surface coating and the friction surface.

4 Claims, 3 Drawing Sheets

FRICTION STIR PROCESSING METHOD FOR A WORKPIECE HAVING SURFACE COATING

CROSS-REFERENCE TO RELATED APPLICATIONS

This application is a divisional of U.S. application Ser. No. 14/299,423, filed Jun. 9, 2014, which claims priority under 35 U.S.C. §119 to European Patent Application No. 13 002 961.4, filed Jun. 10, 2013, the entire disclosure of which is herein expressly incorporated by reference.

BACKGROUND AND SUMMARY OF THE INVENTION

Exemplary embodiments of the invention relate to a friction stir processing tool having a shoulder implemented on a body, which has a friction surface for pressing against at least one workpiece, which is at least partially provided with a surface coating. Furthermore, the invention relates to a friction stir processing device provided with such a friction stir processing tool. Finally, the invention relates to a friction stir processing method, in particular a friction stir welding method, which can be carried out therewith.

The invention is in the field of friction stir processing and in particular friction stir welding. Friction stir welding (FSW) is increasingly used in aerospace technology, in rail traffic technology, entertainment electronics, and in automotive engineering. It is a simple, clean, and innovative joining method, which is distinguished by a high potential for automation and a high efficiency, whereby the production costs are decreased and the weight of structures produced therefrom is reduced.

Friction stir welding was first described in PCT document WO 93/19935. In this case, two workpieces to be welded to one another are brought into contact and held in this position. A welding pin or a pin-shaped projection of a corresponding tool is inserted into the connecting region of the workpieces with rotating movement until a shoulder arranged above the welding pin on the tool rests on the surface of the workpieces. In this case, friction heat is generated by the relative movement between tool and workpieces, so that adjacent material regions in the connecting region assume a plasticized state. The tool is moved forward along a connecting line of the workpieces while the rotating welding pin is in contact with the connecting region, so that the material located around the welding pin plasticizes and subsequently consolidates. Before the material hardens completely the welding pin is removed from the connecting region or the workpieces, respectively.

Materials, for example, metals, their alloys, metal material composites—so-called MMCs—or suitable plastic materials can be welded in this manner as a butt joint, lap joint, or T-joint connection. Spot connections can also be generated, wherein a forward movement of the rotation with the welding pin in contact with the connecting region or a translational relative movement between rotating welding pin and workpieces does not occur.

However, the technique of friction stir processing is also applied in the repair, processing, and finishing of workpieces. In this case, as described above, a pin-shaped projection is inserted into at least one workpiece with rotating movement (i.e., welding is performed in solid material), to modify the workpiece at least in the contact region of the welding pin. For repair purposes, the rotating welding pin is inserted into a crack of a workpiece, for example.

German patent document DE 10 2005 030 800 B4 discloses a friction stir processing tool for friction stir welding for the purpose of connecting a first workpiece and a second workpiece along a weld seam as a connecting line and a corresponding friction stir welding method. In this known method, the pin and the shoulder or a body of the tool bearing the shoulder are rotatable in relation to one another. In particular, the shoulder is fixed during the welding, so that it does not execute a rotational movement (rotational speed n=0). Less friction heat is thus generated in the region of the surface.

Many novel possible welding tasks, for example, the connection of workpieces of entirely differing material consistency, result by way of this welding method known from German patent document DE 10 2005 030 800 B4 and the corresponding tool. For example, metals having low melting temperatures can be welded to metals having higher welding temperatures. This is possible in that the friction heat can be monitored better and therefore the material that softens early can be kept in a plasticized and non-liquid state. Thus, for example, connections are even possible between aluminum workpieces and titanium workpieces. Mixed connections of aluminum-steel are also possible.

However, if workpieces having a surface coating are processed in the friction stir processing method, this leads, as a result of the relative movement between shoulder and workpiece, to the surface coating being damaged.

For example, using the friction stir processing tool described in German patent document DE 10 2005 030 800 B4 and the friction stir welding method described therein, welding can be performed between a galvanized steel plate and an aluminum plate. The friction of the shoulder during the advance of the friction stir processing tool over the connecting line damages the zinc layer of the steel plate in many cases.

Damage to the coating by the shoulder of the friction stir processing tool, for example, the welding tool, generally occurs if friction stir welding processes or friction stir processing processes in general are applied to coated joined parts or workpieces.

Heretofore, the coating of the joined parts or the workpiece was locally reapplied in the weld region after completed welding.

Exemplary embodiments of the invention are directed to friction stir processing methods on coated workpieces having simpler processes.

According to a first aspect, the invention provides a friction stir processing tool having a shoulder implemented on a body, which has a friction surface for pressing against at least one workpiece, which is at least partially provided with a surface coating, and a friction reducing unit for reducing the friction resistance between the surface coating and the friction surface.

By the reduction of the friction resistance on the friction surface region, damage to coatings of a workpiece to be processed may be decreased or avoided, so that a subsequent further local application of the coating can be avoided.

According to one preferred embodiment of the invention, a region of the shoulder that comes into contact with the surface coating of the material to be processed is implemented as more yielding than the surface coating.

It is preferable for the friction reducing unit to have at least one support element for supporting at least a partial region of the friction surface such that at least the partial region of the friction surface is more yielding than the surface coating of the friction surface.

The friction reducing unit is preferably implemented such that the friction forces or the friction load on one partial region of the friction surface of the shoulder are selectively kept lower than on another partial region of the friction surface of the shoulder.

According to a further aspect, the invention provides a friction stir welding tool having a multipart tool shoulder.

This is advantageous for friction stir welding of mixed connections in particular, in which one workpiece is provided with a sensitive surface coating and another workpiece is not.

For example, a first workpiece is formed from galvanized steel plate, which is to be welded onto a second workpiece made of aluminum.

There are many further possible examples of pairs of first and second workpieces, of which a first workpiece is provided with a surface coating.

It is preferable for the friction stir processing tool to be provided with a shoulder implemented on a body, which has a friction surface for pressing against a first workpiece and a second workpiece to be connected to one another.

It is preferable for the friction surface to comprise a first surface region and a second surface region, and the friction reducing unit to be implemented only on a partial region of the body such that the friction resistance on this first surface region of the friction surface is less than the friction resistance on the second surface region of the friction surface.

The first workpiece provided with the surface coating can be engaged with the first surface region, while the vertical process forces are transferable more via the second surface region.

The reduction of the friction can be performed in various ways. Provision with a friction-reducing layer is conceivable. However, the vertical contact pressure forces on the first surface region are preferably less than on the other surface region. This may be achieved by greater yielding of the first surface region than the second surface region.

It is preferable for the support element to be implemented to support the first surface region and to be softer or more yielding than a supporting surface of the second surface region.

It is preferable for the first surface region to be implemented on a region of the body formed from a plastic material and the second surface region to be formed on a region of the body formed from a metal and/or ceramic material.

According to one embodiment, it is preferable for the first surface region to be formed by a first half of the friction surface and the second surface region to be formed by the second half of the friction surface.

Such an embodiment is particularly advantageous for friction stir welding methods, in which a movement of the friction stir processing tool occurs centrally to the connecting line between the workpieces.

According to a further embodiment, it is preferable for one of the surface regions, preferably the first surface region, to be implemented on a partial segment of the friction surface which occupies less than half of the friction surface.

It is preferable for a partition line, which separates the first surface region from the second surface region, to extend off-center to the friction surface. The partition line is preferably arranged such that the second surface region extends by a predefined distance beyond a center line, which can be arranged in an advance direction for the friction stir processing tool, of the friction surface.

Embodiments having an off-center partition between surface regions are advantageous, for example, for friction stir welding methods in which the shoulder is applied and moved off-center to a connecting line between workpieces. This is advantageous, for example, during the welding of workpieces made of materials having significantly differing melting points. The material having the lower melting point plasticizes at lower temperatures than the material having the higher melting point. An off-center application and movement depending on the material composition can therefore be advisable; it is accordingly advantageous to adapt the distribution of the surface regions.

It is preferable for a pin, which protrudes from the shoulder and is drivable to rotate, to be provided, which is rotatable in relation to the shoulder.

It is preferable for the shoulder to be implemented, during a friction stir welding method for connecting a first workpiece and a second workpiece along a weld seam, to be pressed at a rotational speed n=0 against the surface of the first and/or the second workpiece.

According to a further aspect, the invention provides a friction stir processing device comprising a friction stir processing tool according to one of the above-explained embodiments and a tool guiding unit for guiding and moving the friction stir processing tool in an advance direction.

The friction stir processing device is particularly preferably a friction stir welding device, wherein the tool guiding unit is implemented for the purpose of guiding the friction stir processing tool along a connecting line between workpieces to be connected to one another to form a weld seam.

According to a further aspect, the invention provides a friction stir processing method for carrying out a friction stir process on at least one workpiece provided with a surface coating, comprising: using a friction stir processing tool according to one of the above-explained embodiments, wherein the shoulder is selected and/or implemented depending on the surface coating such that, when it is pressed against the surface coating and moved on the surface coating in an advance direction during the friction stir process, it does not damage or at least does not completely abrade or penetrate the coating.

It is preferable for the friction stir processing method to be a friction stir welding method for connecting a first workpiece and a second workpiece by means of friction stir processing along a weld seam, wherein the first workpiece is provided with a surface coating, and the friction stir processing method further comprises: engaging the surface coating using the first surface region and transferring axial forces by means of the second surface region.

A particularly preferred embodiment of the friction stir welding method is characterized by connecting a first workpiece, which is formed from galvanized steel, to a second workpiece, which is formed from a light metal, along the weld seam while pressing the first surface region onto the zinc layer of the first workpiece and pressing the second surface region onto the light metal of the second workpiece.

A further preferred embodiment of the friction stir welding method is characterized by using a friction stir processing tool having off-center partition line between first surface region and second surface region and carrying out the friction stir welding method using friction stir processing tool, which is to be moved offset in relation to the connecting line between first workpiece and second workpiece more toward the second workpiece in the advance direction, wherein the distance of the partition line from the center line is selected as a function of the materials to be connected such that the partition line may be kept in the vicinity of the weld seam. The partition line is preferably to be kept and the distance X is to be selected precisely at the transition between further surface-coated workpiece surface region and plasticized weld seam region.

Exemplary embodiments of the invention will be explained in greater detail hereafter on the basis of the appended drawings.

BRIEF DESCRIPTION OF THE DRAWING FIGURES

DETAILED DESCRIPTION

Figure 1:
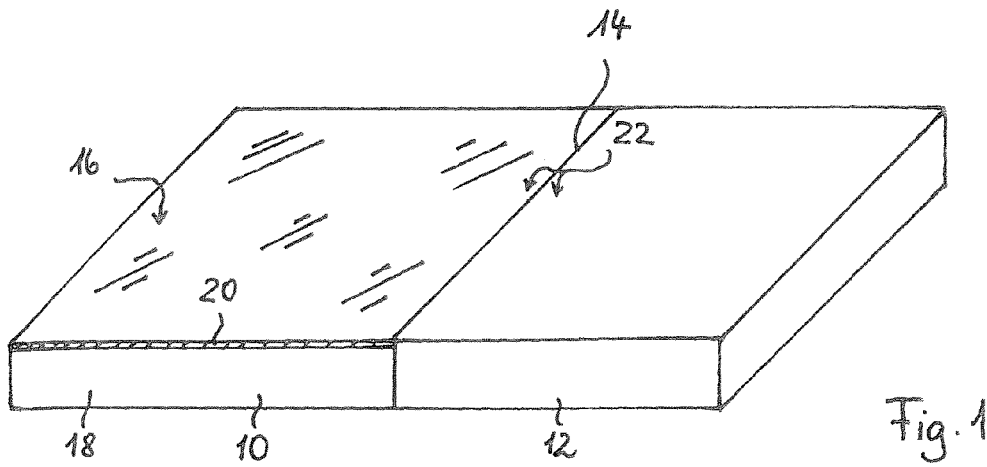
FIG. 1 shows a schematic illustration of a first workpiece having a surface coating and a second workpiece, which are to be connected to one another along a connecting line by a friction stir welding method.

FIG. 1 shows a first workpiece 10 and a second workpiece 12, which are to be welded along a connecting region 14 by a friction stir process. The first workpiece 10 is provided in this case with a surface coating 16.

In one example, the first workpiece 10 is formed by a galvanized steel plate 18, in which the surface coating 16 is formed by a zinc layer 20.

The second workpiece 12 can be an arbitrary workpiece connectable correspondingly to the steel plate 18. For example, the second workpiece 12 is formed from a light metal, for example, an aluminum alloy or the like.

Figure 2:
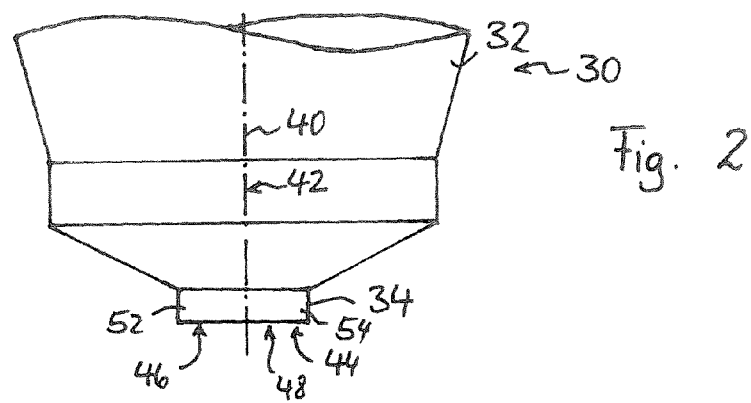
FIG. 2 shows a schematic illustration of a friction stir processing tool for carrying out a friction stir processing method in the form of a friction stir welding method for connecting the workpieces shown in FIG. 1.
Figure 3:
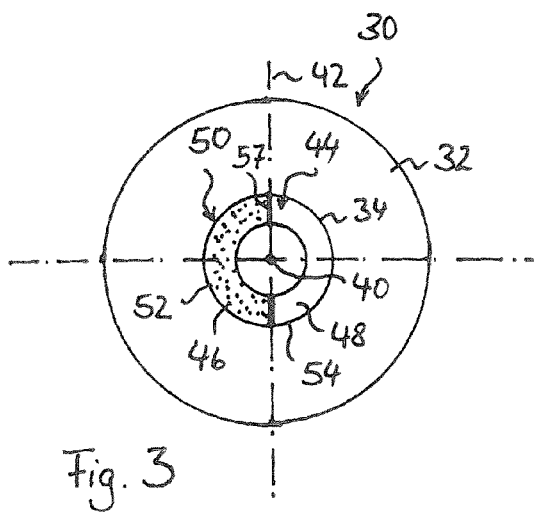
FIG. 3 shows a top view of a first embodiment of the friction stir processing tool shown in a side view in FIG. 2.
Figure 4:
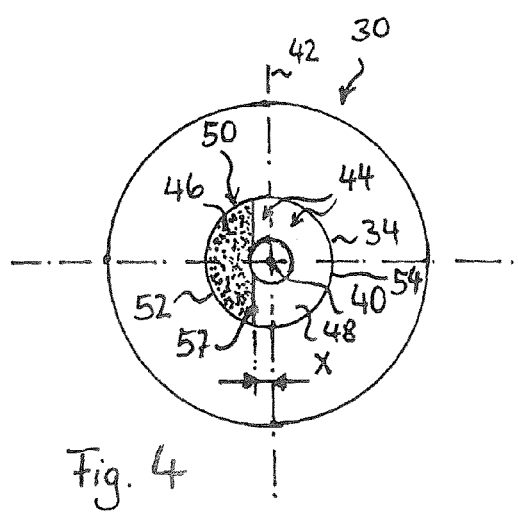
FIG. 4 shows a top view of a second embodiment of the friction stir processing tool shown in a side view in FIG. 2.

In FIGS. 2, 3, and 4, a partial element of a friction stir processing tool 30 for carrying out the friction stir welding method for connecting the first workpiece 10 and the second workpiece 12 along the connecting region 14 is shown.

This partial element of the friction stir processing tool 30 is a body 32, on which a shoulder 34 is provided for pressing against a surface 22 of the workpieces 10, 12 along the connecting region 14.

The body 32 having the shoulder 34 is, as described in greater detail in German patent document DE 10 2005 030 800 B4, assembled together with a separately provided pin 36 (also called welding pin or probe, see FIG. 5 in this regard), which is drivable to rotate, to form the friction stir processing tool 30. In this case, the body 32 is rotatable in relation to the pin 36, so that the shoulder 34 can be held stationary and not rotate during the friction stir processing operation—i.e., a stationary shoulder 34 is used.

In FIGS. 2, 3, and 4, a center plane 42, which includes the center axis 40 (coincident with the axis of rotation of the pin) through the body 32 is shown, this plane dividing the body 32 into two halves in an imaginary manner.

The shoulder 34 has the friction surface 44, which rubs on the surface 22 of the workpieces 10, 12.

This friction surface 44 is divided into a first surface region 46 on the first half and a second surface region 48 on the second half. Still further surface regions can also be provided in embodiments which are not shown.

In the exemplary embodiments of the friction stir processing tool 30 shown in FIG. 3 and FIG. 4, the shoulder 34 is implemented as multipart, so that the surface regions 46, 48 are implemented on different parts of the shoulder 34.

A friction reducing unit 50 is provided, by which the friction resistance of at least one partial region of the friction surface 44 is reduced during rubbing over the surface 22 in relation to a body without friction reducing unit.

The friction reducing unit 50 is implemented for selective reduction of the friction resistance on a partial region of the friction surface 44.

In the embodiments shown in FIG. 3 and FIG. 4, the friction reducing unit 50 is assigned to the first surface region 46, so that a friction resistance between the first surface region 46 and the surface 22 is less than a friction resistance between the second surface region 48 and the surface 22.

In one embodiment of the friction reducing unit 50, the first surface region 46 is implemented on a support element 52 for this purpose, which is embodied as softer or more yielding than a supporting surface 54 of the second surface region 48.

For example, the support element 52 is formed from plastic or similar materials, while the supporting surface 54 is formed from metal material and/or ceramic material.

These different materials can be formed by the different partial elements of the shoulder 34.

When carrying out the friction stir welding method and connecting the first workpiece 10 and the second workpiece 12, the body 32 having the shoulder 34 is aligned in this case so that the first surface region 46 engages on the surface coating 16 of the first workpiece, while the second surface region 48 engages on the surface of the second workpiece 12. In this orientation, the friction stir processing tool 30 is then moved during the friction stir welding method along the connecting region 14, e.g., the connecting line, to thus form a weld seam 46.

In FIG. 3, the size of the first surface region 46 is equal to that of the second surface region 48, so that the friction reducing unit 50 occupies essentially half of the friction surface 44.

FIG. 4 shows an embodiment in which the first surface region 46 occupies a smaller part of the friction surface 44 than the second surface region 48. The friction reducing unit 50 occupies essentially only the region beyond the connecting region 14 to be formed during the welding operation here, as will be explained in greater detail hereafter.

In FIGS. 3 and 4, the first surface region 46 and the second surface region 48 are separated by a partition line 57. The surface regions 46 and 48 are implemented, for example, in the form of a crescent, sickle, or ring segment. The partition line 57 can lie, as shown in FIG. 3, centrally on the center line of the friction surface 44, i.e., on the center plane 42. The partition line 57 can also, however, as shown in FIG. 4, be arranged remotely at a distance X from the center plane 42, preferably extending parallel thereto. For example, an assortment of friction stir processing tools can be provided, in the case of which the distance X varies. The selection of the friction stir processing tool and thus the selection of the distance X is performed depending on the welding task.

The friction stir processing tool 30 does not have to be positioned centrally in the joint during the generation of a mixed connection between two different workpieces. To protect the friction stir processing tool against wear, for example, in the case of a connection of joining partners having significantly different melting or softening temperatures, one proceeds such that the tool may penetrate only minimally into the respective harder joining partner. In such cases, for example, in the case of welding of workpieces made of steel or titanium, on the one hand, to a workpiece made of light metal such as aluminum alloy, on the other hand, an application and movement of the friction stir processing tool is advantageously performed off-center to the connecting line between the workpieces. The distance X can be selected corresponding to the respective advantageous off-center offset, as indicated in FIG. 4.

Figure 5:
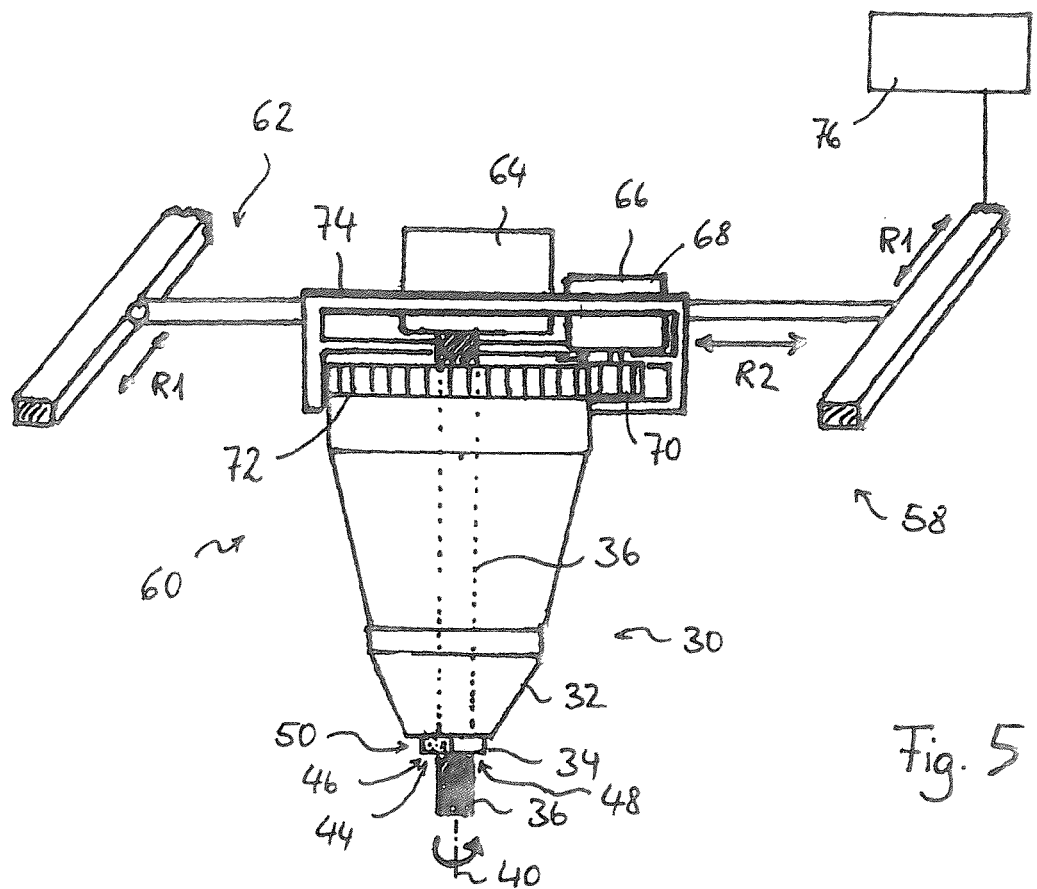
FIG. 5 shows a schematic illustration of a friction stir processing tool for carrying out the friction stir process using the embodiments of the friction stir processing tool shown in FIGS. 2 and 3.

FIG. 5 shows, to illustrate the performance of the friction stir welding method, a friction stir processing device 58 in the form of a friction stir welding device 60, which has the friction stir processing tool 30 having the body 32 and the pin 36 driven so it is rotatable thereto, and also a tool guiding unit 62, using which the friction stir processing tool 30 is movable in a first direction R1 and a second direction R2, to guide it along the connecting region 14. Of course, a vertical adjustment can also be provided to move the friction stir processing tool 30 in the third dimension.

The friction stir welding device 60 furthermore has a rotary drive 64 for the rotational driving of the pin 36—which can also be referred to as a welding pin or probe—and a pivot unit 66 for aligning the body 32 having the shoulder 34 such that the first surface region 46 having the reduced friction is placed on the surface coating 16. The pivot unit 66 has a stepping motor 68, which holds the body 32 in the matching position via a gear wheel 70 and a gear ring 72. This is all controlled via a controller 76.

Rotary drive 64, pin 36, and body 32 are held on a housing or a frame 74, which is movable by means of the tool guiding unit 62 in the respective desired directions R1 and R2.

Instead of the simple tool guiding unit 62 like a gantry crane shown in FIG. 5, of course, many other tool guiding units 62 can also be used, for example, robot arms or the like.

Figure 6:
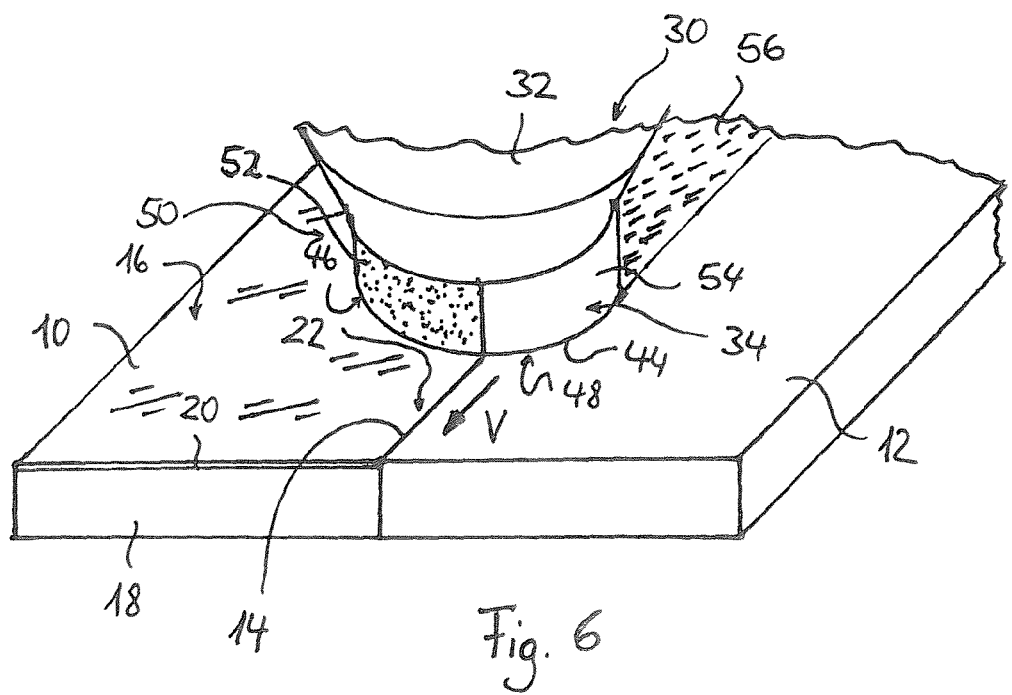
FIG. 6 shows a schematic simplified illustration of a friction stir welding method, which is to be carried out using the friction stir processing device according to FIG. 4, for connecting the workpieces shown in FIG. 1.

FIG. 6 shows how the friction stir processing tool 30 is moved along the connecting region 14 in the advance direction V, wherein the plasticization of the workpiece material and the formation of the weld seam 56 are performed by rotating the pin 36. In this case, the first surface region 46 rests on the surface coating 16, while the vertical process forces are transferred more via the second surface region 48.

While the friction stir processing tool 30 is moved along the connecting region, the pivot drive 66 aligns the friction stir processing tool 30 so that the center plane 42 extends substantially parallel to the advance direction V. In this case, it can be preferable, depending on the type of the materials, for the pin 36 and therefore the center axis 40 and therefore in turn the center plane 42 to not be arranged precisely centrally to the connecting region 14, but rather offset in the direction perpendicular to the advance direction toward the center of the connecting region 14, for example, so that the pin 36 only minimally penetrates into one of the workpieces 10, 12 and penetrates more into the other of the workpieces 10, 12.

For this purpose, a friction stir processing tool 30 according to FIG. 3 or FIG. 4 having corresponding matching distance X is selected beforehand during the preparation of the welding method, depending on the advantageous relative location of the center plane 42 of the friction stir processing tool 30 in relation to the connecting region 14—centered or more or less off-center—and subsequently used.

In other cases (not shown in greater detail), it can be that also the second workpiece 12 is provided with the surface coating 16, or friction stir processing methods are to be carried out on a single workpiece having surface coating.

Figure 7:
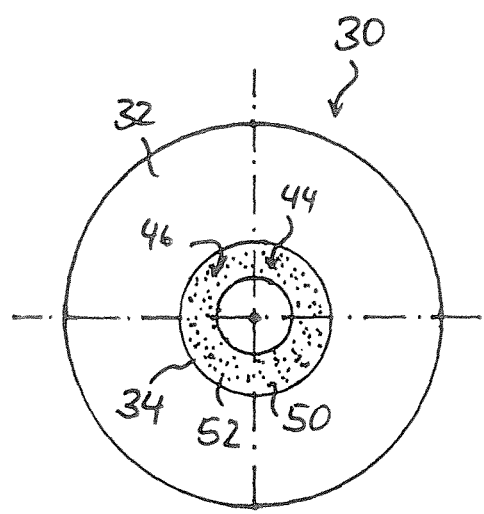
FIG. 7 shows a top view of a third embodiment of the friction stir processing tool.

For these purposes, the third embodiment of the body 32 shown in FIG. 7 can also be used, wherein the friction reducing unit 50 acts on the entire friction surface 44, to reduce its friction resistance during application to the surface coating 16. For example, the friction reducing unit 50 is provided on the entire circumference of the shoulder 34.

In a concrete example of the multipart shoulder of FIG. 3 or FIG. 4, the support element 52 is formed from PTFE, while the second element of the shoulder 34, which forms the supporting surface 54, is formed from steel.

In the exemplary embodiment of FIG. 7, the friction surface 44 rests entirely on the ring-shaped support element 52 made of PTFE.

Although the friction stir processing tool 30 and the friction stir processing device 58 have been described on the basis of the example of a tool or a device, respectively, for carrying out a friction stir welding method, the application is not thus restricted to this case. Other friction stir processing methods can also be carried out using such friction stir processing tools.

The advantages of the above-described embodiments will be explained in greater detail hereafter.

During the application of a friction stir welding process to coated joined parts—workpieces 10, 12—damage to the coating occurs due to the shoulder 34 of a heretofore conventional welding tool. Heretofore, the procedure, that the coating of the joined parts has subsequently been reapplied locally in the weld seam region, has been used.

In contrast, if a shoulder is used on a body 32, as shown in FIGS. 2, 3, 4, and 7, the surface coating 16 may then be protected by a friction reduction. In particular, friction stir welding of galvanized steel may therefore be carried out without damaging the zinc layer. A stationary shoulder 34 is preferably used, which is softer than the zinc layer.

In particular in the case of mixed connections between aluminum and steel, a further preferred solution is to form one part of the welding tool shoulder 34 as metallic or ceramic, to be able to transfer a sufficient vertical process force, and to form a further part of the shoulder 34 as organic, for example, from PTFE, to generate little friction and to protect the surface of one joining partner.

Reworking of the welding for the purpose of renewing a previous coating is no longer necessary.

In particular, in one embodiment, a body 32 of a friction stir processing tool 30 having a multipart shoulder 34 is provided. The distribution of the individual parts on the shoulder 34 is selected according to the welding task to be achieved. Depending on welding tasks to be carried out, a central partition line 57 or an off-center partition line 57 having advantageous distance X to be determined from the center plane 42 can be selected. One criterion for the selection is that a surface coating 16 is protected and maintained as cleanly as possible by contact with friction-reducing friction surface, while impervious tool surfaces and/or the plasticized region can be contacted by a friction surface optimized for the highest possible pressure transfer.

The friction stir welding method is applied in particular in the construction of aircraft, where workpieces having different material properties are to be connected to one another.

The requirement also exists more and more in automotive engineering of connecting steel parts and aluminum parts to one another. This is now possible more easily than heretofore using the tool proposed here.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 10 first workpiece
12 second workpiece
14 connecting region
16 surface coating
18 steel plate
20 zinc layer
22 surface
30 friction stir processing tool
32 body
34 shoulder
36 pin
40 center axis
42 center plane
44 friction surface
46 first surface region
48 second surface region
50 friction reducing unit
52 support element
54 supporting surface
56 weld seam
57 partition line
58 friction stir processing device
60 friction stir welding device
62 tool guiding unit
64 rotary drive
66 pivot unit
68 stepping motor
70 gear wheel
72 gear ring
74 frame
76 controller
R1 first direction
R2 second direction
V advance direction
X distance between partition line and center plane

What is claimed is:

1. A friction stir processing method for carrying out a friction stir process on at least one workpiece provided with a surface coating, comprising:
   performing a friction stir processing using a friction stir processing tool, which comprises
      a body;
      a shoulder disposed on the body of the friction stir processing tool, wherein the shoulder includes
         a friction surface configured to contact at least one workpiece, wherein the workpiece is at least partially provided with a surface coating; and
         a friction reducing unit configured to reduce a friction resistance between the surface coating and the friction surface,
   wherein the friction surface comprises a first surface region and a second surface region, and the friction reducing unit is arranged such that the friction resistance on the first surface region of the friction surface is less than the friction resistance on the second surface region of the friction surface, and
   wherein the shoulder is selected or implemented depending on the surface coating such that, as the shoulder is pressed against the surface coating and moved on the surface coating in an advancing direction during the friction stir process, it does not damage or at least does not completely abrade or penetrate the surface coating.

2. The friction stir processing method of claim 1, wherein the friction stir processing method is a friction stir welding method for connecting a first workpiece and a second workpiece by means of friction stir welding along a weld seam, wherein the first workpiece is provided with a surface coating, and the friction stir processing method furthermore comprises:
   engaging the surface coating using the first surface region of the friction surface and transferring axial forces by way of the second surface region of the friction surface.

3. The friction stir welding method of claim 2, comprising:
   wherein the first workpiece is formed from galvanized steel and the second workpiece is formed from a light metal, and wherein said connecting comprises connecting the first workpiece and the second workpiece along the weld seam while pressing the first surface region against a zinc layer of the first workpiece and pressing the second surface region against the light metal of the second workpiece.

4. The friction stir welding method of claim 2, wherein the friction stir processing tool is moved along the weld seam offset in relation to the weld seam toward the second workpiece, wherein the distribution of the first and second surface regions is selected as a function of the materials to be connected such that a partition line formed between the surface regions may be kept on the weld seam.

* * * * *